United States Patent
Chen et al.

(10) Patent No.: US 8,964,882 B2
(45) Date of Patent: Feb. 24, 2015

(54) METHOD OF DETERMINING PRECODING MATRIX AND CORRESPONDING COMMUNICATION METHODS AND DEVICES

(75) Inventors: Jinhui Chen, PuDong Jinqiao Shanghai (CN); Lu Wu, Pudong Jinqiao Shanghai (CN); Yang Song, PuDong Jinqiao Shanghai (CN); Hongwei Yang, PuDong Jinqiao Shanghai (CN); Di Lv, PuDong Jinqiao Shanghai (CN)

(73) Assignee: Alcatel Lucent, Boulogne-Billancourt (FR)

( * ) Notice: Subject to any disclaimer, the term of this patent is extended or adjusted under 35 U.S.C. 154(b) by 12 days.

(21) Appl. No.: 13/704,151

(22) PCT Filed: Jun. 24, 2011

(86) PCT No.: PCT/IB2011/001778
§ 371 (c)(1),
(2), (4) Date: Dec. 13, 2012

(87) PCT Pub. No.: WO2012/020294
PCT Pub. Date: Feb. 16, 2012

(65) Prior Publication Data
US 2013/0089165 A1    Apr. 11, 2013

(30) Foreign Application Priority Data
Jun. 24, 2010    (CN) .......................... 2010 1 0208370

(51) Int. Cl.
*H04L 27/04*    (2006.01)
*H04B 7/04*    (2006.01)
(Continued)

(52) U.S. Cl.
CPC ............ *H04B 7/0478* (2013.01); *H04B 7/0469* (2013.01); *H04B 7/065* (2013.01);
(Continued)

(58) Field of Classification Search
USPC ................................................ 375/295, 260
See application file for complete search history.

(56) References Cited

U.S. PATENT DOCUMENTS

2008/0303699 A1    12/2008   Zhang et al.
2010/0284484 A1 *  11/2010   Jongren et al. ................ 375/267
(Continued)

FOREIGN PATENT DOCUMENTS

WO    WO 2009/091307 A1    7/2009

OTHER PUBLICATIONS

Samsong, "Views on the feedback framework for Rel. 10," 3$^{rd}$ Generation Partnership Project (3GPP), 3GPP TSG RAN WG1 Meeting #61, R1-103026, pp. 1-15, Montreal, Canada, May 10-14, 2010.
(Continued)

*Primary Examiner* — Eva Puente
(74) *Attorney, Agent, or Firm* — Fay Sharpe LLP

(57) ABSTRACT

In order to improve the performance of the precoding scheme for closely-spaced cross-polarized CLA antennas, the invention proposes a new precoding codebook and precoding matrix. The invention also proposes a method for determining precoding matrix based on the new precoding codebook, and corresponding method and device for communicating by using this precoding matrix. The precoding codebook and matrix proposed in the invention has better performance.

8 Claims, 1 Drawing Sheet

(51) Int. Cl.
  H04B 7/06 (2006.01)
  H04B 7/10 (2006.01)
  H04L 25/03 (2006.01)

(52) U.S. Cl.
  CPC .......... H04B 7/10 (2013.01); *H04L 25/03343* (2013.01); *H04L 2025/03426* (2013.01); *H04L 2025/03808* (2013.01)
  USPC .......... 375/295; 375/367; 375/396; 375/316; 370/329; 370/252; 370/241

(56) References Cited

U.S. PATENT DOCUMENTS

2011/0305299 A1* 12/2011 Prasad et al. ................ 375/296
2013/0028344 A1* 1/2013 Chen et al. ................... 375/267
2013/0129008 A1* 5/2013 Ko et al. ...................... 375/295

OTHER PUBLICATIONS

LG Electronics, "Consideration on feedback design for LTE-A," 3rd Generation Partnership Project (3GPP), 3GPP TSG RAN WG1 Meeting #61, R1-102724, pp. 1-4, Montreal, Canada, May 10-14, 2010.

Ericsson et al., "Further Refinements of Feedback Framework," 3rd Generation Partnership Project (3GPP), 3GPP TSG-RAN WG1 #60bis, R1-101742, 8 pages, Beijing, China, Apr. 12-16, 2010.

International Search Report for PCT/IB2011/001778 dated Jan. 19, 2012.

Jiang, Lei, et al., "On the Modelling of Polarized MIMO Channel", Fraunhofer Institute for Telecommunications, Heinrich-Hertz Institut, Berlin, Germany.

\* cited by examiner

METHOD OF DETERMINING PRECODING MATRIX AND CORRESPONDING COMMUNICATION METHODS AND DEVICES

TECHNICAL FIELD

The invention relates to multi-antenna technology, particularly relates to precoding method in the multi-antenna technology.

BACKGROUND OF THE ART

According to the agreed way forward for Rel-10 feedback [1], a precoder for a subband is composed of two matrices, one of which targets wideband and/or long-term channel properties, denoted by $W_1$, and the other targets frequency-selective and/or short-term channel properties, denoted by $W_2$. The eNB determines the $W_1$ via long-term wideband feedback, and determines the $W_2$ via short-term narrowband feedback.

For closely-spaced multi-antenna, the precoding scheme could take the antenna-related characteristic brought by the closely spacing into consideration, so as to simplify the design of the precoding scheme. The industry has discussed about the precoding codebook of the closely-spaced cross-polarized CLA. In R1-103026, Samsung has proposed their two-stage feedback approach with $W_1$ a M×r matrix and $W_2$ a M×M square matrix; and in R1-101742, Ericsson has proposed their two-stage feedback approach with $W_1$ a M×2 matrix and $W_2$ a 2×r matrix, wherein M is the amount of the antennas and r is the amount of the data flows. The performance of both above approaches under the MU-MIMO scenario, such as data throughput, is not satisfying.

SUMMARY OF THE INVENTION

The invention proposes a precoding scheme based on a new code book, and this scheme has better data throughput.

According to a first aspect of the invention, it is proposed a method for determining precoding matrix for sub-band precoding, wherein the transmitter has two set of cross-polarized antennas, the channel vectors of the two set of antennas with different polarization direction are $H_1$ and $H_2$ respectively, these antennas are closely-spaced, M is the amounts of the transmitting antennas, r is the amount of the data flows, the channel vectors $H_1$ and $H_2$ satisfy the following complex relationship:

$$H_2 = \beta e^{j\delta} H_1$$

Wherein $\beta$ is the amplitude of the complex relationship between the two channel vector, and $\delta$ is the angle of the complex relationship between the two channel vector;

the method comprises the following steps:

a. determining, according to long-term channel related information, an optimized first matrix $W_1$ with a dimension of M×M, the first matrix corresponding to wideband and/or long-term channel properties, and the first matrix $W_1$ is selected from first codebook below:

$$W_1 = \begin{pmatrix} R & 0 \\ 0 & R \end{pmatrix},$$

-continued $$R = \begin{pmatrix} v_1^* \\ e^{-j\theta} v_1^* \\ \vdots \\ e^{-j(M/2-1)\theta} v_1^* \end{pmatrix} = \begin{pmatrix} 1 & e^{j\theta} & \cdots & e^{j(M/2-1)\theta} \\ e^{-j\theta} & 1 & \cdots & e^{j(M/2-2)\theta} \\ \vdots & & \ddots & \vdots \\ e^{-j(M/2-1)\theta} & \cdots & \cdots & 1 \end{pmatrix}$$

Wherein, R is a proximity of the transmitting space correlation matrix of $H_1$, $v_1 = [1, e^{-j\theta}, \ldots, e^{-j(M/2-1)\theta}]$ is a dominant eigenvector of the transmitting space correlation matrix of $H_1$, proximated by DFT vector, $\theta$ is the angle difference between the two neighboring item of the DFT vector;

b. multiplying the optimized first matrix $W_1$ with each second matrix $W_2$ with a dimension of M×r in a second codebook, so as to obtain a plurality of candidate precoding-matrices, wherein the second matrix $W_2$ corresponds to frequency-selective and/or short-term channel properties and is selected from second codebook below:

$$W_2 = (W_2^1, W_2^2, \ldots W_2^r),$$

wherein, $W_2^i$ is the i-th column of $W_2$, letting $n = \lfloor (i-1)/2 \rfloor + 1$, the n-th element of $W_2^i$ is 1, and the (n+M/2)-th element is $\beta e^{j\delta}$ when mod(i,2)=1, is $1/\beta e^{-j\delta}$ when mod(i,2)=0 and other elements are 0;

c. selecting an optimized one from the plurality of candidate precoding matrices for precoding the data to be transmitted based on predefined rules, according to the short-term channel properties.

According to a second aspect of the invention, it is proposed a method, in a user equipment, for feeding precoding matrix for sub-band precoding back to an eNodeB, comprising the steps of:

determining said optimized first matrix $W_1$ and precoding matrix, by using a method according to the aforesaid first aspect of the invention;

determining an optimized second matrix $W_2$ corresponding to said optimized precoding matrix;

providing, for the eNodeB, identifications of said optimized first matrix $W_1$ and said second matrix $W_2$.

Correspondingly, the invention also proposes a device, in a user equipment, for feeding precoding matrix for sub-band precoding back to an eNodeB, comprising:

a determining means, for determining said optimized first matrix $W_1$ and precoding matrix, by using a method according to the aforesaid first aspect of the invention, and determining an optimized second matrix $W_2$ corresponding to said optimized precoding matrix;

a sender, for providing, for the eNodeB, identifications of said optimized first matrix $W_1$ and said second matrix $W_2$.

According to the third aspect of the invention, it is proposed a method, in an eNodeB, for precoding data, comprising:

receiving identifications of an optimized first matrix $W_1$ and second matrix $W_2$, fed back by a user equipment;

determining, from the first codebook and the second code book in a method according to the aforesaid first aspect of the invention, the optimized first matrix $W_1$ and second matrix $W_2$, according to the identifications;

multiplying the optimized first matrix $W_1$ and second matrix $W_2$, and obtaining optimized precoding matrix;

precoding data to be transmitted by using the optimized precoding matrix, so as to transmit the data to the user equipment.

Correspondingly, the invention also proposes a device, in an eNodeB, for precoding data, comprising:

a receiver, for receiving identifications of an optimized first matrix $W_1$ and second matrix $W_2$, fed back by a user equipment;

a inquiring means, for determining, from the first codebook and the second code book in a method according to the aforesaid first aspect of the invention, the optimized first matrix $W_1$ and second matrix $W_2$, from the identifications;

a calculating means, for multiplying the optimized first matrix $W_1$ and second matrix $W_2$, and obtaining optimized precoding matrix;

a precoder, for precoding data to be transmitted by using the optimized precoding matrix, so as to transmit the data to the user equipment. The above and other features will be elucidated in the following detailed embodiments, or become obvious from the following detailed embodiments.

DESCRIPTION OF THE DRAWINGS

The exemplary embodiment exists in the construction, arrangement, and combination of the various parts of the device, and steps of the method, whereby the objects contemplated are attained as hereinafter more fully set forth, specifically pointed out in the claims, and illustrated in the accompanying drawings in which:

DETAILED EMBODIMENTS

Figure 1:
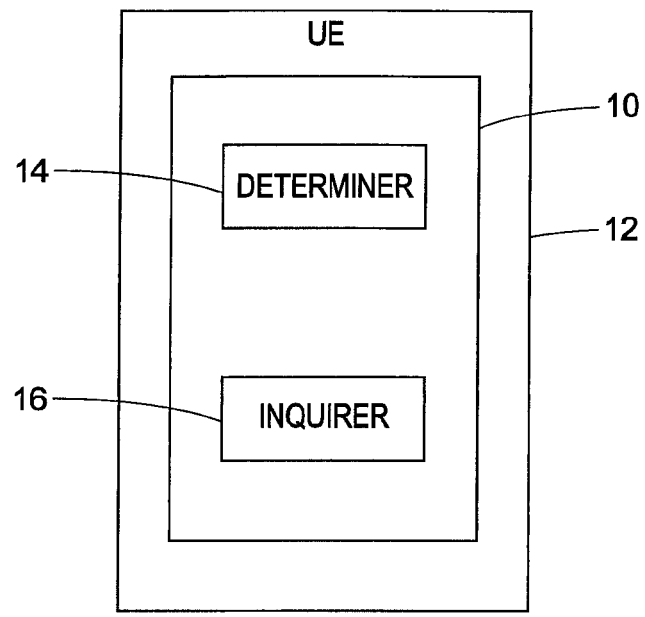
FIG. 1 is a block diagram of a device in a user equipment in accordance with aspects of the exemplary embodiment.

Firstly, the design of codebook according to the invention will be elucidated as following.

For two groups of cross-polarized antennas, by observation, the inventors find that there exists a fast-varying complex vector relationship between the two antenna groups, as described by the following formula:

$$H_2 = \beta e^{j\delta} H_1 \quad (1)$$

Wherein $H_1$ is the channel vector representing one antenna group on one polarization and $H_2$ is the channel vector representing the other antenna group on the other polarization, $\beta$ is the amplitude of the complex relationship between the two channel vector, and $\delta$ is the angle of the complex relationship between the two channel vectors. $H_1$ can be treated as the long-term wideband static channel. This observation agrees with the theoretical analysis on cross-polarized antennas in reference document ((L. Jiang, L. Thiele, and V. Jungnickel, "On the Modelling of Polarized MIMO Channel," 13th European Wireless Conference, Paris, France, April 2007).

For closely-spaced antennas, the dominant eigenvector in $H_1$, $v_1$, can be approximated by a DFT vector:

$$v_1 = [1, e^{-j\theta}, \ldots, e^{-j(M/2-1)\theta}] \quad (2)$$

For single layer (rank) (the amount of data flows is 1), the precoding matrix for sub-band precoding is described as the following formula:

$$W = \begin{pmatrix} R & 0 \\ 0 & R \end{pmatrix} \begin{pmatrix} 1 \\ 0 \\ \beta e^{j\delta} \\ 0 \end{pmatrix} = \begin{pmatrix} v_1^T \\ \beta e^{j\delta} v_1^T \end{pmatrix} \quad (3)$$

Wherein $$W_1 = \begin{pmatrix} R & 0 \\ 0 & R \end{pmatrix}$$

with a dimension of M×M, $$R = \begin{pmatrix} v_1^* \\ e^{-j\theta} v_1^* \\ \vdots \\ e^{-j(M/2-1)\theta} v_1^* \end{pmatrix} = \begin{pmatrix} 1 & e^{j\theta} & \cdots & e^{j(M/2-1)\theta} \\ e^{-j\theta} & 1 & \cdots & e^{j(M/2-2)\theta} \\ \vdots & \vdots & \ddots & \vdots \\ e^{-j(M/2-1)\theta} & \cdots & \cdots & 1 \end{pmatrix}$$

And the precoding matrix $W_2 = [1, 0, \beta e^{j\delta}, 0]^T$ with a dimension of M×1. For closely-spaced cross-polarized CLA antennas, $W_1$ can be treated as a channel correlation matrix of the two groups of cross-polarized antennas, and R can be treated as the channel correlation matrix of the group of antennas corresponding to $H_1$.

Optionally, the mode of the correlation factor of the closely-spaced antennas is greater than a predetermined threshold, or the distance between the antennas is equal to or less than half of the wavelength of the signal.

For two layers (the amount of data flows is 2), $W_1$ doesn't change, and $W_2$ is determined according to the following formula:

$$W_2 = \begin{pmatrix} 1 & 1 \\ 0 & 0 \\ \beta e^{j\delta} & \frac{1}{\beta} e^{-j\delta} \\ 0 & 0 \end{pmatrix}.$$

Generally, for the case that the amount of data flows is r, $W_2 = (W_2^1, W_2^2, \ldots W_2^r)$ wherein, $W_2^i$ is the i-th column of $W_2$, letting $n = \lfloor (i-1)/2 \rfloor + 1$, the n-th element of $W_2^i$ is 1, and the (n+M/2)-th element is $\beta e^{j\delta}$ when mod(i,2)=1, is $1/\beta e^{-j\delta}$ when mod(i,2)=0 and other elements are 0.

For example, in an embodiment, for M transmitting antennas and maximum 2 layers, the 16 codewords $w_{2,i}$ in the 4-bit second codebook $W_2$ are determined by the formula in the following table 1:

TABLE 1

| Serial No. | Codeword |
|---|---|
| $i = 0, \ldots, 2^4 - 1$ | $W_{2,i} = \begin{pmatrix} 1 \\ 1 \\ 0 \\ 0 \\ \beta_m e^{j\delta_n} & \frac{1}{\beta_m} e^{-j\delta_n} \\ 0 \\ 0 \end{pmatrix}$ |
| | wherein, $m = \lfloor i/2^2 \rfloor$ and $n = \text{mod}(i, 2^2)$. | wherein $\beta_0 = 0.5$, $\beta_1 = 1$, $\beta_2 = 2$, $\beta_3 = 4$, and $\delta_0 = -\pi/2$, $\delta_1 = \pi/2$, $\delta_3 = \pi$.

The 256 codewords $w_{1,i}$ in the 8-bit first codebook are determined by the formula in the following table 2:

TABLE 2

| Serial No. | Codeword |
|---|---|
| $i = 0, \ldots, 2^8 - 1$ | $W_{1,i} = \begin{pmatrix} R_n & 0 \\ 0 & \alpha_m R_n \end{pmatrix}$ | and, $R_n =$ $$\begin{pmatrix} 1 & re^{j\theta_n} & \cdots & r^{M/2-1}e^{j(M/2-1)\theta_n} \\ re^{-j\theta_n} & 1 & \ddots & \vdots \\ \vdots & \ddots & 1 & re^{j\theta_n} \\ r^{M/2-1}e^{-j(M/2-1)\theta_n} & \cdots & re^{-j\theta_n} & 1 \end{pmatrix},$$

$m = \lfloor i/2^6 \rfloor$ and $n = \mathrm{mod}(i, 2^6)$.

wherein, $\alpha_0=0.25$, $\alpha_1=0.5$, $\alpha_2=1$, $\alpha_3=2$ $r=1$, and $\theta_n=n\pi/32$, $n=0, \ldots, 2^6-1$.

The selected values of the amplitude α and β are used for covering the amplitude of the complex relationship falling into a certain range, and the selected values of the angle difference δ, θ are used for covering the cases that the angle difference falls into difference location ranged from 0-2Π, in order to evenly and completely provide a plurality of candidate complex relationships for selecting the nearest first matrix and second matrix according to the channel status information. It should be noted, in case that the bit number of the first codebook and second codebook, namely the amount of the first matrices and the second matrices, change, the values of the amplitude and angle difference can be adjusted correspondingly, so as to evenly and completely provide a plurality of candidate complex relationships.

Correspondingly, as shown in FIG. 1, the invention also proposes a device 10, in a user equipment 12, for feeding a precoding matrix for sub-band precoding back to an eNodeB, the device 10 comprising a determiner 14 that determines the optimized first matrix $W_1$ and the precoding matrix, by using a method according to one or more of the aforesaid aspects of the invention, and determines an optimized second matrix $W_2$ corresponding to said optimized precoding matrix, and a sender 16, that provides, for the eNodeB, identifications of the optimized first matrix $W_1$ and the second matrix $W_2$.

Figure 2:
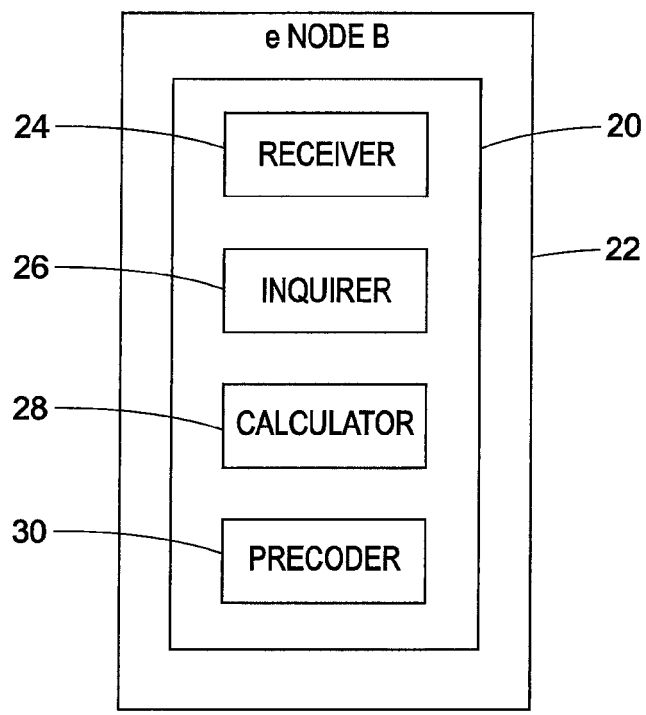
FIG. 2 is a block diagram of a device in an eNodeB in accordance with aspects of the exemplary embodiment.

Correspondingly, as shown in FIG. 2, the invention also proposes a device 20, in an eNodeB 22, for precoding data, the device 20 comprising a receiver 24, that receives identifications of an optimized first matrix $W_1$ and second matrix $W_2$ fed back by a user equipment, an inquirer 26 that determines, from the first codebook and the second code book in a method according to one or more of the aforesaid aspects of the invention, the optimized first matrix $W_1$ and second matrix $W_2$, from the identifications, a calculator 28 that multiplies the optimized first matrix $W_1$ and second matrix $W_2$ and obtains an optimized precoding matrix, and a precoder 30 that precodes data to be transmitted by using the optimized precoding matrix, so as to transmit the data to the user equipment. The above and other features will be elucidated in the following detailed embodiments, or become obvious from the following detailed embodiments.

The codewords determined according to the invention is described by the above embodiment. It should be noted that the invention is not limited by this set of codeword, and those skilled in the art could determine other suitable codeword based on the disclosure in the invention.

The following part will describe the embodiment of carrying out precoding communication based on the codewords determined by the invention.

Firstly, the user equipment (UE) measures long-term channel properties, and selects, from the first codebook such as the codebook in table 2, an optimized first matrix $W_1$ with a dimension of M×M, according to the long-term channel properties. It is well known for those skilled in the art that how to select a corresponding optimized codeword according to the long-term channel properties, and the description will not give unnecessary detail.

After that, to multiply the first matrix $W_1$ with each second matrix $W_2$ with a dimension of M×r in a second codebook, so as to obtain a plurality of candidate precoding matrices. The second codebook is such as the codebook as shown in table 1.

Then, the UE selects an optimized precoding matrix from the plurality of candidate precoding matrices based on predefined rules, according to the measured short-term channel properties. The predefined rules are such as to select a candidate precoding matrix enabling a maximum channel capacity. It should be noted that other rules are also applicable, and the description will not give unnecessary details.

Then, the UE can determine an optimized second matrix $W_2$ corresponding to the optimized precoding matrix.

At last, the UE provides, for the eNodeB, identifications of the optimized first matrix $W_1$ and the second matrix $W_2$. The identifications are such as the serial numbers of the matrix in the codebook.

On the side of the eNodeB, it receives identifications of the optimized first matrix $W_1$ and second matrix $W_2$ fed back by user equipments. Then, the eNodeB determines, from the first codebook and the second code book, the optimized first matrix $W_1$ and second matrix $W_2$, according to the identifications.

After that, the eNodeB multiplies the optimized first matrix $W_1$ and second matrix $W_2$ and obtains an optimized precoding matrix for sub-band pre coding.

At last, the eNodeB precodes data to be transmitted by using the optimized precoding matrix, so as to transmit the data to the user equipment. The inventor simulates the performance of the codebook proposed in the invention, and compares it with the simulation results of the schemes proposed in the prior art. The following table 3 shows the assumed wireless network environment, based on which the simulation is carried out.

TABLE 3

| Parameter | Assumptions used for evaluation |
|---|---|
| Deployment scenario | 3GPP case 1 3D, SCM-UMa with large angle spread. Speed: 3 km/h |
| Antenna configuration (eNodeB) | CLA, 0.5 wavelengths between antennas (4 Tx: xx) |
| Antenna configuration (UE) | Cross-polarized at UE (2 Rx: +) |
| Downlink transmission scheme | Single-cell Tx correlation-aided MU-MIMO, rank 1 per UE |
| Downlink scheduler | Proportional fair in time and frequency |
| Feedback assumptions | Subband PMI, subband CQI, long-term wideband Tx covariance report PMI/CQI/RI report with 5 ms periodicity, 6 ms delay Tx correlation report with 100 ms periodicity, 6 ms delay Subband CQI with measurement error: N(0.1 dB) per PRB |
| Downlink HARQ scheme | Chase combining |
| Downlink receiver type | MMSE |

TABLE 3-continued

| Parameter | Assumptions used for evaluation |
|---|---|
| Channel estimation | Ideal |
| Control channel and reference signal overhead | As agreed in ITU assumption with DL CCH of 3 OFDM symbols LTE Rel.8: 0.3158 LTE-A: 0.3063 |

The simulation result is shown by the following table 4:

TABLE 4

| | Average throughput | Cell edge |
|---|---|---|
| R1-101742 | 2.8 (100%) | 0.08 (100%) |
| R1-103026 | 2.3 (82.1%) | 0.10 (125%) |
| The invention | 3.0 (107.1%) | 0.11 (137.5%) |

It can be seen that the invention achieve better performance than the art. Those ordinary skilled in the art could understand and realize modifications to the disclosed embodiments, through studying the description, drawings and appended claims. The word "comprising" does not exclude the presence of elements or steps not listed in a claim or in the description. The word "a" or "an" preceding an element does not exclude the presence of a plurality of such elements. In the practice of present invention, several technical features in the claim can be embodied by one component. In the claims, any reference signs placed between parentheses shall not be construed as limiting the claim.

What is claimed is:

1. A method for determining a precoding matrix for sub-band precoding for a transmitter, wherein the transmitter is to be associated with at least two sets of cross-polarized antennas with different polarization directions, wherein channel vectors of the two sets of antennas are $H_1$ and $H_2$ respectively, the two sets of antennas are closely spaced, M is the amount of the transmitting antennas, r is the amount of the data flows, and the channel vectors $H_1$ and $H_2$ of the two sets of antennas satisfy the following complex relationship:

$$H_2 = \beta e^{j\delta} H_1$$

Wherein $\beta$ is the amplitude of the complex relationship between the two channel vectors, and $\delta$ is the angle of the complex relationship between the two channel vectors; the method comprising:

determining, according to long-term channel related information, an optimized first matrix $W_1$ with a dimension of M×M, the first matrix corresponding to wideband or long-term channel properties, wherein the first matrix $W_1$ is selected from a first codebook of the form:

$$W_1 = \begin{pmatrix} R & 0 \\ 0 & R \end{pmatrix},$$

$$R = \begin{pmatrix} v_1^* \\ e^{-j\theta} v_1^* \\ \vdots \\ e^{-j(M/2-1)\theta} v_1^* \end{pmatrix} = \begin{pmatrix} 1 & e^{j\theta} & \cdots & e^{j(M/2-1)\theta} \\ e^{-j\theta} & 1 & \cdots & e^{j(M/2-2)\theta} \\ \vdots & \vdots & \ddots & \vdots \\ e^{-j(M/2-1)\theta} & \cdots & \cdots & 1 \end{pmatrix},$$

wherein, R is a proximity of the transmitting space correlation matrix of $H_1$, $v_1 = [1, e^{-j\theta}, \ldots, e^{-j(M/2-1)\theta}]$ is a dominant eigenvector of the transmitting space correlation matrix of $H_1$, approximated by a DFT vector, $\theta$ is the angle difference between the two neighboring items of the DFT vector;

multiplying the optimized first matrix $W_1$ with a second matrix $W_2$ with a dimension of M×r in a second codebook to obtain a plurality of candidate precoding matrices, wherein the second matrix $W_2$ corresponds to frequency-selective or short-term channel properties and is selected from a second codebook of the form:

$$W_2 = (W_2^1, W_2^2, \ldots W_2^r),$$

wherein, $W_2^i$ is the i-th column of $W_2$, letting $n = \lfloor (i-1)/2 \rfloor + 1$, the n-th element of $W_2^i$ is 1, and the (n+M/2)-th element is $\beta e^{j\delta}$ when mod(i,2)=1, is $1/\beta e^{-j\delta}$ when mod(i,2)=0 and other elements are 0;

selecting a precoding matrix from the plurality of candidate precoding matrices for precoding the data to be transmitted based on predefined rules, according to the short-term channel properties, thereby selecting an optimized precoding matrix.

2. The method according to claim 1, wherein, for the second codebook $W_2$, when the amount of data flows is 1, $$W_2 = [1, 0, \beta e^{j\delta}, 0]^T$$

and when the amount of data flows is 2, $$W_2 = \begin{pmatrix} 1 & 1 \\ 0 & 0 \\ \beta e^{j\delta} & \frac{1}{\beta} e^{-j\delta} \\ 0 & 0 \end{pmatrix}.$$

3. The method according to claim 2, wherein, for M transmitting antennas and maximum 2 ranks, the codeword in the 4-bit second codebook $W_2$ is determined by the following formula:

$$W_{2,i} = \begin{pmatrix} 1 & 1 \\ 0 & 0 \\ \beta_m e^{j\delta_n} & \frac{1}{\beta_m} e^{-j\delta_n} \\ 0 & 0 \end{pmatrix},$$

wherein $i=0, \ldots, 2^4-1$, $m=\lfloor i/2^2 \rfloor$, $n=\text{mod}(i,2^2)$, $\beta_0=0.5$, $\beta_1=1$, $\beta_2=2$, $\beta_3=4$ and $\delta_0=-\pi/2$, $\delta_1=\pi/2$, $\delta_2=0$, $\delta_3=\pi$;

the codeword $W_{1,i}$ in the 8-bit first codebook $W_1$ is determined by the following formula:

$$W_{1,i} = \begin{pmatrix} R_n & 0 \\ 0 & \alpha_m R_n \end{pmatrix}, \text{ and}$$

$$R_n = \begin{pmatrix} 1 & re^{j\theta_n} & \cdots & r^{M/2-1} e^{j(M/2-1)\theta_n} \\ re^{-j\theta_n} & 1 & \ddots & \vdots \\ \vdots & \ddots & 1 & re^{j\theta_n} \\ r^{M/2-1} e^{-j(M/2-1)\theta_n} & \cdots & re^{-j\theta_n} & 1 \end{pmatrix}$$

wherein $i=0, \ldots, 2^8-1$, $m=\lfloor i/2^6 \rfloor$, $n=\text{mod}(i, 2^6)$ and $\alpha_0=0.25$, $\alpha_1=0.5$, $\alpha_2=1$, $\alpha_3=2$, $r=1$ and $\theta_n = n\pi/32$, $n=0, \ldots, 2^6-1$.

4. The method according to claim 1, wherein the mode of the correlation factor of the closely-spaced antennas is greater than a predetermined threshold, or the distance between the antennas is equal to or less than half of the wavelength of the signal.

5. A method, in a user equipment, for feeding precoding matrix for sub-band precoding back to an eNodeB, the method comprising:
   determining said optimized first matrix $W_1$ and precoding matrix, by using the method accordinq to claim 1;
   determining an optimized second matrix $W_2$ corresponding to said optimized precoding matrix;
   providing, for the eNodeB, identifications of said optimized first matrix $W_1$ and said second matrix $W_2$.

6. A method, in an eNodeB, for precoding data, comprising:
   receiving identifications of an optimized first matrix $W_1$ and an optimized second matrix $W_2$, fed back by a user equipment;
   determining, from the first codebook and the second code book in the method according to claim 1, the optimized first matrix $W_1$ and second matrix $W_2$, according to the identifications;
   multiplying the optimized first matrix $W_1$ and second matrix $W_2$, and obtaining an optimized precoding matrix;
   precoding data to be transmitted by using the optimized precoding matrix, so as to transmit the data to the user equipment.

7. A device, in a user equipment, for feeding precoding matrix for sub-band precoding back to an eNodeB, comprising:
   a determiner that determines an optimized first matrix $W_1$ and a precoding matrix, by using the method according to claim 1, and determining determines an optimized second matrix $W_2$ corresponding to said optimized precoding matrix;
   a sender, that provides, for the eNodeB, identifications of said optimized first matrix $W_1$ and said second matrix $W_2$.

8. A device, in an eNodeB, for precoding data, cornprsising:
   a receiver that receives identifications of an optimized first matrix $W_1$ and an optimized second matrix $W_2$, fed back by a user equipment;
   an inquirer that determines, from the first codebook and the second code book in the method according to claim 1, the optimized first matrix $W_1$ and second matrix $W_2$, from the identifications;
   a calculator that multiplying the optimized first matrix $W_1$ and second matrix $W_2$, and obtaining an optimized precoding matrix;
   a precoder that precodes data to be transmitted by using the optimized precoding matrix, so as to transmit the data to the user equipment.

* * * * *